US009116055B2

(12) United States Patent
Johnston

(10) Patent No.: US 9,116,055 B2
(45) Date of Patent: Aug. 25, 2015

(54) COMBUSTION TURBINE FLASHBACK SENSING SYSTEM EMPLOYING FIBER BRAGG GRATING SENSORS

(75) Inventor: Robert T. Johnston, Orlando, FL (US)

(73) Assignee: Siemens Energy, Inc, Orlando, FL (US)

( * ) Notice: Subject to any disclaimer, the term of this patent is extended or adjusted under 35 U.S.C. 154(b) by 421 days.

(21) Appl. No.: 13/603,503

(22) Filed: Sep. 5, 2012

(65) Prior Publication Data
US 2014/0064332 A1 Mar. 6, 2014

(51) Int. Cl.
G02B 6/00 (2006.01)
G01K 13/02 (2006.01)
G01K 11/32 (2006.01)

(52) U.S. Cl.
CPC ............ *G01K 11/3206* (2013.01); *G01K 13/02* (2013.01); *G01K 2013/024* (2013.01); *G01K 2205/00* (2013.01)

(58) Field of Classification Search
CPC ........................................................ G02B 6/00
USPC ......... 374/120, 121, 130–132, 137, 110, 112, 374/114, 141, 144, 160–161; 356/43; 340/870.17; 702/1; 385/12
See application file for complete search history.

(56) References Cited

U.S. PATENT DOCUMENTS

| 4,827,487 | A * | 5/1989 | Twerdochlib | 374/152 |
|---|---|---|---|---|
| 6,424,784 | B1 * | 7/2002 | Olson | 385/135 |
| 6,442,304 | B1 * | 8/2002 | Crawley et al. | 385/12 |
| 6,558,036 | B2 * | 5/2003 | Gysling et al. | 374/147 |
| 6,644,848 | B1 * | 11/2003 | Clayton et al. | 374/7 |
| 6,925,809 | B2 | 8/2005 | Nowill | |
| 7,845,848 | B2 * | 12/2010 | Yakymyshyn et al. | 374/119 |
| 8,342,793 | B2 * | 1/2013 | Way et al. | 415/1 |
| 8,740,455 | B2 * | 6/2014 | Hall | 374/136 |
| 2002/0021880 | A1 * | 2/2002 | Olson | 385/135 |
| 2005/0061058 | A1 * | 3/2005 | Willsch et al. | 73/23.32 |
| 2005/0180699 | A1 * | 8/2005 | Shu et al. | 385/89 |
| 2008/0095612 | A1 * | 4/2008 | Girbig et al. | 415/118 |
| 2008/0137092 | A1 * | 6/2008 | Kraemer et al. | 356/477 |
| 2008/0218758 | A1 * | 9/2008 | Xia et al. | 356/437 |
| 2009/0055071 | A1 * | 2/2009 | Way et al. | 701/100 |
| 2009/0129721 | A1 * | 5/2009 | Chen et al. | 385/12 |
| 2010/0287906 | A1 | 11/2010 | Xia et al. | |
| 2010/0290733 | A1 | 11/2010 | Xia et al. | |
| 2010/0319350 | A1 | 12/2010 | Landry et al. | |

(Continued)

FOREIGN PATENT DOCUMENTS

WO 2012109183 A1 8/2012

*Primary Examiner* — Gail Kaplan Verbitsky

(57) ABSTRACT

A combustion turbine flashback sensing system with a sensor cable that includes an optical fiber having at least one and preferably multiple fiber Bragg grating (FBG) temperature sensors along the fiber. The sensor cable is oriented in a combustor turbine upstream a combustion zone, so that it is capable of sensing temperature at multiple sensing points within the combustor. A protective conduit having a first thermal conductivity circumscribes the optical fiber. A sensor shield is oriented in circumferential proximity to the FBG temperature sensor. It is preferable that each such sensor has an associated sensor shield. The sensor shield has a thermal conductivity greater than the conduit thermal conductivity. The sensor shield facilitates FBG sensor rapid thermal response, with sufficient thermal and mechanical shielding to isolate the sensor from harsh operating conditions within the combustor, while the less thermally conductive conduit provides greater isolation protection for the cable structure.

19 Claims, 7 Drawing Sheets

(56) References Cited

U.S. PATENT DOCUMENTS

| | | |
|---|---|---|
| 2012/0026482 A1 | 2/2012 | Dailey |
| 2012/0147924 A1* | 6/2012 | Hall ............................... 374/161 |
| 2013/0206760 A1* | 8/2013 | Susko .......................... 220/88.3 |
| 2013/0278918 A1* | 10/2013 | Glavind et al. ................. 356/32 |

* cited by examiner

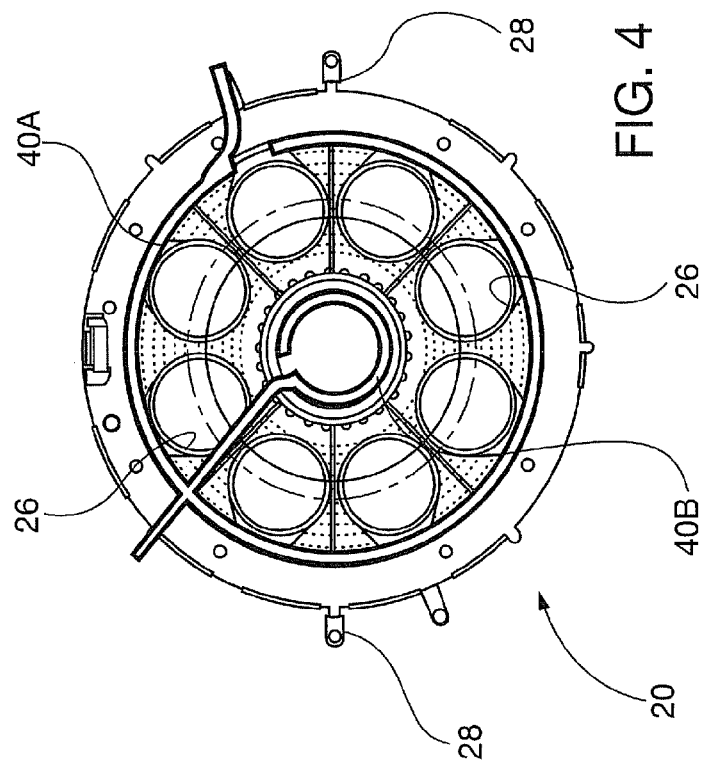
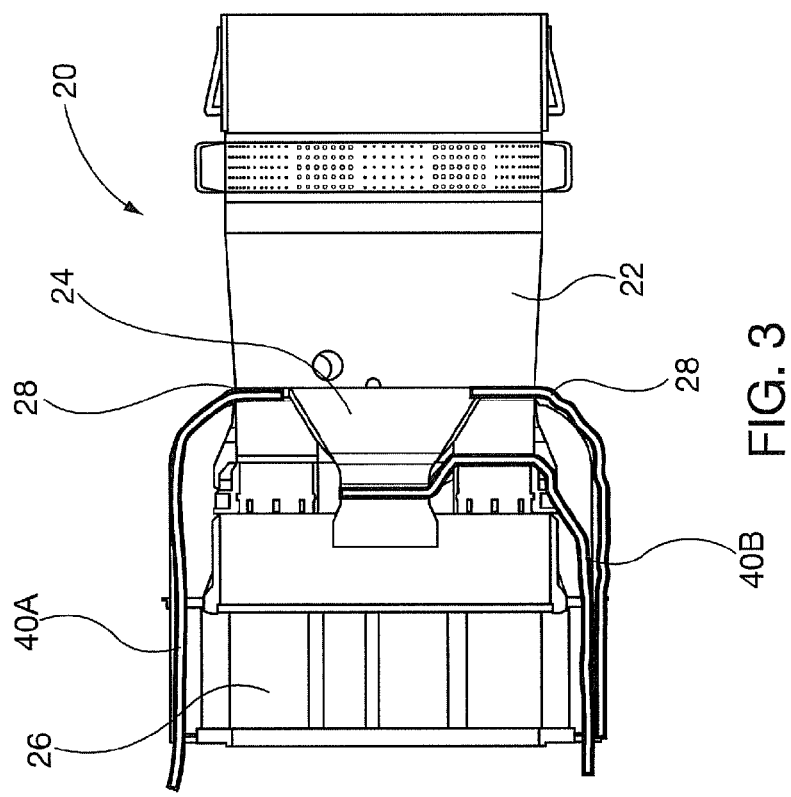

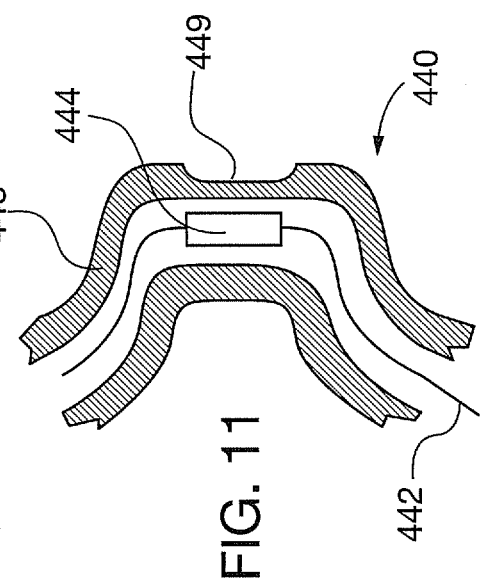
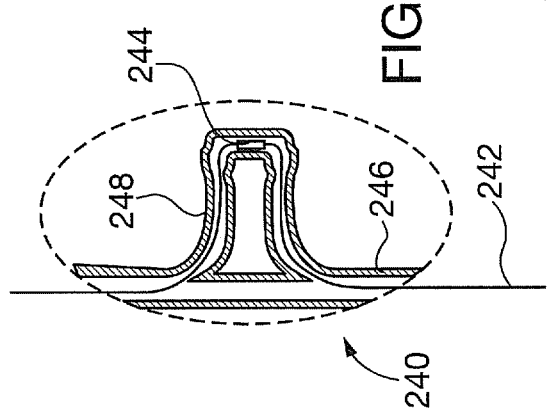
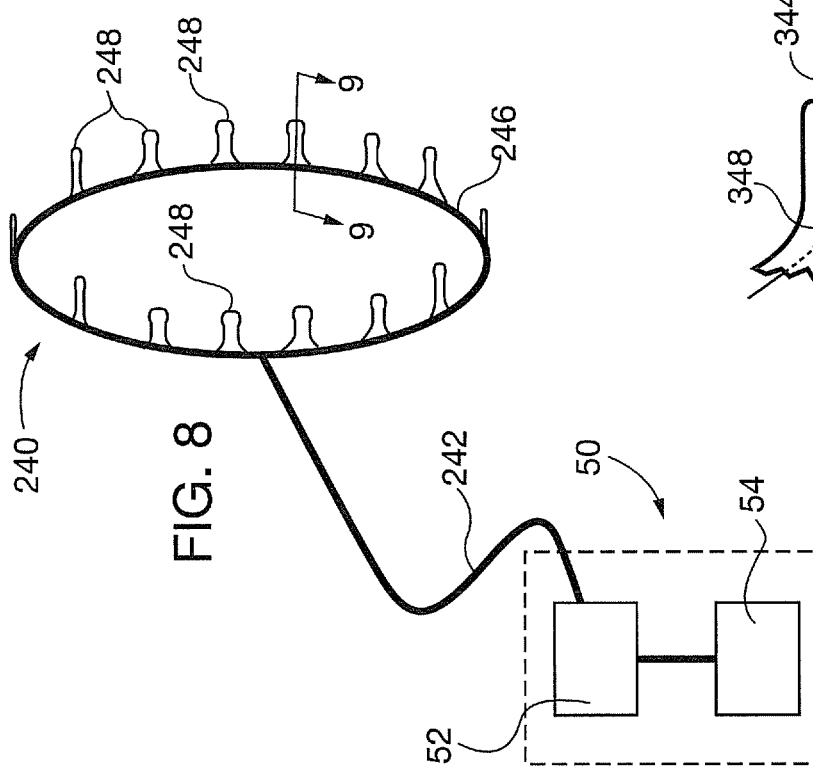

COMBUSTION TURBINE FLASHBACK SENSING SYSTEM EMPLOYING FIBER BRAGG GRATING SENSORS

BACKGROUND OF THE DISCLOSURE

1. Field of the Invention

The invention relates to systems for detecting temperature in combustion turbines upstream of the combustion zone with optical fiber Bragg temperature sensors, and more particularly to systems employing such temperature sensors for detecting combustion turbine flashback.

2. Description of the Prior Art

Two objectives in design and operation of gas turbine combustors are the stability of the flame and prevention of flashbacks. A flashback occurs when flame travels upstream from the combustion zone in the combustion chamber and approaches, contacts, and/or attaches to, an upstream component, such as the venturi or premix chamber. Or, the flame may flash back into a fuel/air mixing apparatus, damaging components that mix the fuel with the air. Upstream components are not designed to withstand combustion temperatures for significant time exposure before they are damaged and need repair.

A multitude of factors and operating conditions provide for efficient and clean operation of the gas turbine combustor area during ongoing operation. Although a stable lean mixture is desired for fuel efficiency and for environmentally acceptable emissions, a flashback may occur more frequently with a lean mixture, and particularly during an unstable operating condition of the engine. Not only is the fuel/air mixture important, also relevant to gas turbine operation are the shape of the combustion area, the arrangement of assemblies that provide fuel, and the length of the combustor that provides varying degrees of mixing. Given the efficiency and emissions criteria, the operation of gas turbines requires a balancing of design and operational approaches to maintain efficiency, meet emission standards, and avoid damage due to undesired flashback occurrences.

Flashback conditions are monitored with flashback detectors so that corrective action may be taken to avoid the above-described damage to upstream combustor components. Known flashback detectors utilize thermocouple sensors mounted within the combustor basket assemblies and feed sensor readings to a temperature measurement apparatus. Flashback thermocouple sensors are generally designed to have a response time of less than three seconds, so that timely corrective actions can be performed to abate a flashback event. Temperature information is utilized by a flashback detection system that associates changes in absolute temperature with a flashback condition. Upon associating a temperature change with a flashback condition the information is routed to the turbine combustor fuel/air control system for remediation in accordance with known control parameters (e.g., increase combustor intake airflow to suppress or extinguish the flashback flame front).

Thermocouples are individually hard-wire connected to the temperature measurement apparatus. Thermocouple sensor lead wires are routed in the combustor basket in bundles. Given wiring complexities and limited space confines within the combustor basket envelope often one—or no more than a few—thermocouples are installed in each combustor basket. Thermocouples are exposed to the harsh, relatively hot environment within the combustor basket and susceptible to damage during flashback events. It is desirable to increase the number of temperature sensing and interrogation points within individual combustor baskets, to get more detailed information about the severity of an incipient flashback event, and preferably obtain more response lead time to take remedial action before the combustor basket suffers thermal damage. It is also desirable to utilize sensors that have quicker transient temperature response time, that are robust in construction for heat damage tolerance and relatively simpler to install than known thermocouples.

Commercially available fiber optic temperature sensors employing fiber Bragg grating (FBG) sensors are known for robust, heat resistant construction, capable of withstanding temperatures in the 1800° F. (~1000° C.) range. FBG sensors cause a reflected output wavelength that is associated with sensor temperature. A string of serially coupled FBG sensors on a single fiber optic strand are capable of transmitting temperature information (reflected wavelength) from each sensor to a known optical interrogator. The interrogator or a temperature measurement device coupled to the interrogator associates the received reflected wavelengths with sensor temperature. Hence, a single fiber optic sensing cable, coupled to a light source and an optical interrogator can transmit multiple, essentially simultaneous, temperature information reflected waveforms back to the interrogator, which has quick sampling rates and quick sampling speeds.

However, commercial fiber optic FBG temperature sensor cables are not suitably packaged for insertion into gas turbine combustor baskets under continuous operating conditions. Among other things, the naked FBG sensor cables need to be protected from combustion flashback, entrained fuel/airflow erosion, and/or vibration damage. Naked FBG sensor cables also need to be isolated from influences in the combustor basket environment that might impact accurate temperature and/or temperature rate of change readings. Strain-induced wavelength shifts may negatively influence temperature-induced wavelength shifts.

FBG sensors wrapped in protective insulative fabric and encased with heavy metal shielding have been proposed for measuring gas turbine exhaust temperatures and for obtaining temperature profiles within turbine exhaust streams. Some embodiments of exhaust temperature profile sensors include window cutouts proximal FBG sensors. While exhaust temperature profile FBG sensors have sufficient external shielding and wrapped insulation to survive in the very hot combustion environment, their shielding/insulation thermal mass (and low thermal conductivity) is not satisfactory for obtaining accurate, rapidly changing temperature information and temperature rate of change information that is desirable for combustor basket flashback detection upstream of the turbine combustion zone.

SUMMARY OF THE INVENTION

Accordingly, an object of the invention is to provide a combustion turbine flashback detection sensor and sensing system that facilitates obtaining temperature measurements at multiple sensing points within individual combustor baskets.

Another object of the invention is to provide a combustion turbine flashback detection sensor and sensing system that has quicker transient temperature response time, more robust construction for heat resistance, and relatively simpler to install within combustor baskets than known thermocouple-based flashback sensing systems.

Yet another object of the invention is to provide a combustion turbine flashback detection sensor employing FBG thermal sensors that are inserted in the combustor basket upstream of the combustion zone, that have quicker transient temperature response and rate of temperature change response than FBG sensors employed in combustion exhaust environments.

These and other objects are achieved in accordance with the present invention by a combustion turbine flashback sensing system with a sensor cable that includes an optical fiber having at least one and preferably multiple fiber Bragg grating (FBG) temperature sensors along the fiber. The sensor cable is oriented in a combustor upstream a combustion zone, so that it is capable of sensing temperature at multiple sensing points within the combustor. The sensor cable includes a protective conduit having a hollow cavity circumscribing the optical fiber. The conduit has a first thermal conductivity. A sensor shield is coupled to the conduit, oriented in circumferential proximity to the FBG temperature sensor. If the cable has more than one FBG sensor it is preferable that each such sensor has an associated sensor shield. The sensor shield has a second thermal conductivity greater than the first thermal conductivity. In this way, the sensor shield facilitates FBG sensor rapid thermal response, with sufficient thermal and mechanical shielding to isolate the sensor from harsh operating conditions within the combustor basket, while the less thermally conductive conduit provides greater isolation protection for the remainder of the cable structure.

Embodiments of the invention feature a combustion turbine flashback sensor cable, comprising an optical fiber having a fiber Bragg grating (FBG) temperature sensor along the fiber. A conduit having a hollow cavity circumscribes the optical fiber. The conduit has a first thermal conductivity. A sensor shield is coupled to the conduit, oriented in circumferential proximity to the FBG temperature sensor, having a second thermal conductivity greater than the first thermal conductivity.

Other embodiments of the invention feature a combustion turbine combustor temperature monitoring system, comprising a combustion turbine flashback sensor cable, adapted for insertion within a combustor upstream a combustion zone. The sensor cable has: an optical fiber and a fiber Bragg grating (FBG) temperature sensor along the fiber. A conduit having a hollow cavity circumscribes the optical fiber, and has a first thermal conductivity. A sensor shield is coupled to the conduit, oriented in circumferential proximity to the FBG temperature sensor, having a second thermal conductivity greater than the first thermal conductivity. The monitoring system also has an illumination source for transmission of light through the optical fiber and an optical sensor interrogator coupled to the optical fiber, for associating reflected light output from the fiber with temperature sensed by the FBG temperature sensor.

Yet other embodiments of the invention feature a combustion turbine, with a plurality of combustors. A combustion turbine flashback sensor cable is inserted in each respective combustor upstream a combustion zone. The sensor cable includes an optical fiber and a fiber Bragg grating (FBG) temperature sensor along the fiber. A conduit having a hollow cavity circumscribes the optical fiber. The conduit has a first thermal conductivity. A sensor shield is coupled to the conduit, oriented in circumferential proximity to the FBG temperature sensor, and has a second thermal conductivity greater than the conduit's first thermal conductivity. An illumination source is coupled to each respective optical fiber for transmission of light through the optical fiber. An optical sensor interrogator is coupled to each respective optical fiber, for associating reflected light output from the fiber with temperature sensed by the respective FBG temperature sensor.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 3 is a schematic axial view of a combustor including embodiments of a flashback detection sensor cable system of the present invention oriented circumferentially within the combustor upstream a combustion zone;

FIG. 4 is a radial end view of the combustor of FIG. 3;

FIG. 8 is a perspective view of another embodiment of a flashback detection system including a flashback sensor cable of the present invention;

FIG. 9 is a cross-sectional view of the flashback sensor cable of FIG. 8, taken along 9-9 thereof;

FIG. 10 is a cross-sectional view of an alternative embodiment of the flashback sensor cable of FIG. 8;

FIG. 11 is a cross-sectional view of another alternative embodiment of the flashback sensor cable of FIG. 8.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a combustion turbine flashback sensing system with a sensor cable that includes an optical fiber having at least one and preferably multiple fiber Bragg grating (FBG) temperature sensors along the fiber. The sensor cable with multiple FBG sensors is oriented in a combustor turbine upstream a combustion zone, so that it is capable of sensing temperature at multiple sensing points within the combustor. Exemplary multiple sensor mounting embodiments include axial and/or radial array orientations within a combustor upstream a combustion zone. The sensor cable includes a protective conduit having a hollow cavity circumscribing the optical fiber. The conduit has a first thermal conductivity. A sensor shield is coupled to the conduit, oriented in circumferential proximity to the FBG temperature sensor. If the cable has more than one FBG sensor it is preferable that each such sensor has an associated sensor shield. The sensor shield has a second thermal conductivity greater than the first thermal conductivity. In this way, the sensor shield facilitates FBG sensor rapid thermal response, with sufficient thermal and mechanical shielding to isolate the sensor from harsh operating conditions within the combustor, while the less thermally conductive conduit provides greater isolation protection for the remainder of the cable structure. The present invention sensor cable enables easier installation of multiple temperature sensors within a combustor than known, individually-wired thermocouples.

Figure 1:
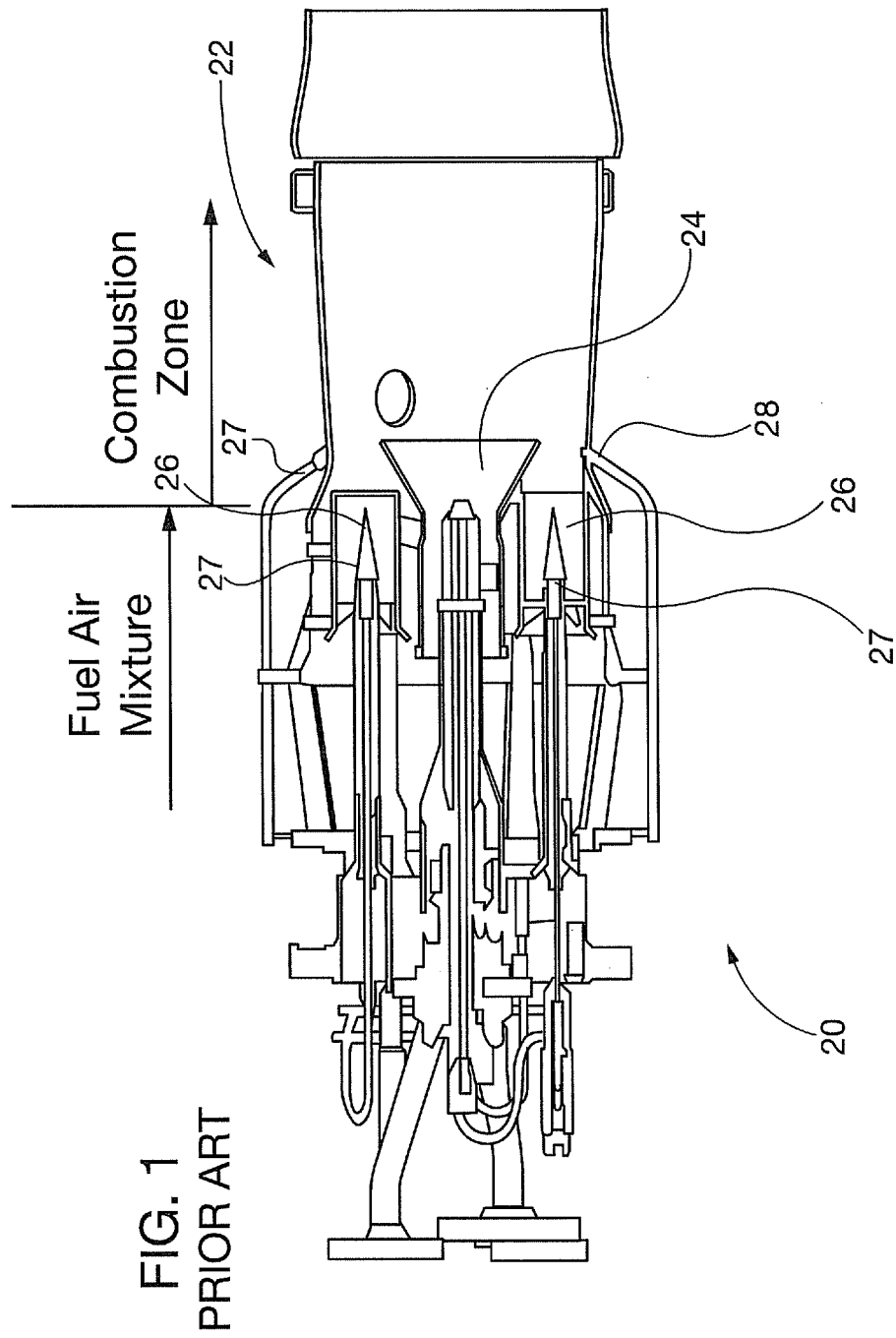
FIG. 1 is an elevational view of an exemplary known prior art combustor.

FIG. 1 shows an exemplary basket style combustor 20 of known construction. The combustor basket 22 is in the combustion zone, and is capable of withstanding sustained combustion temperatures. The nozzle portion 24 of the venturi, combustion swirlers 26 and fuel nozzles 27 are in the fuel/air mixture zone of the combustor, upstream of the combustion zone, the zone boundary of which is established by the igniters 28 that ignite the fuel/air mixture. A flashback event occurs when the combustion zone flame front enters the fuel/air mixture zone, potentially causing damage to components in that zone.

Figure 2:
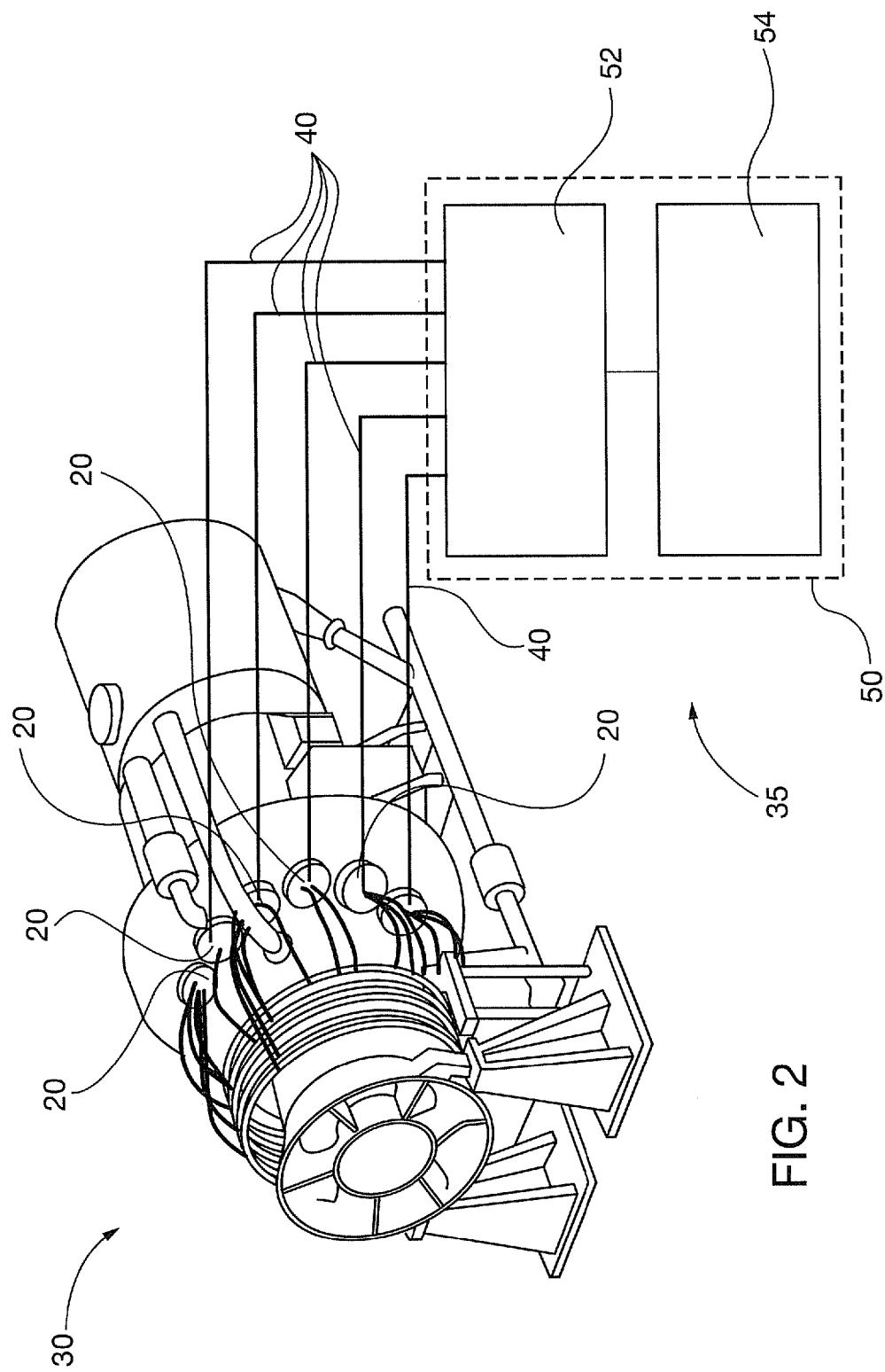
FIG. 2 is a schematic perspective view of a gas turbine including a flashback detector system of the present invention.

The combustion turbine 30 in FIG. 2 incorporates the flashback detection system 50 of the present invention that is shown schematically as a flashback sensor cable 40 oriented within each combustor 20. Each sensor cable 40 comprises at least one and preferably a plurality of FBG temperature sensors. The flashback detection system 50 associates changes in reflected light output from the sensor cable 40 with temperature sensed by the FBG temperature sensor embedded within the cable. The flashback detection system 50 further comprises a fiber optic illumination source and interrogator 52 coupled to each respective flashback sensor cable 40. The illumination source provides light to the sensor cable 40 FBG sensor(s) and the interrogator receives waveforms that have been reflected from the FBG sensor(s). Both the illumination source and the interrogator are commercially available products available from National Instruments of Austin, Tex., U.S.A. A flashback detector 54 is coupled to the interrogator 52. The illumination source, interrogator 52 and flashback detector 54 may comprise separate devices or may be incorporated in a unified flashback detection system 50.

Figure 6:
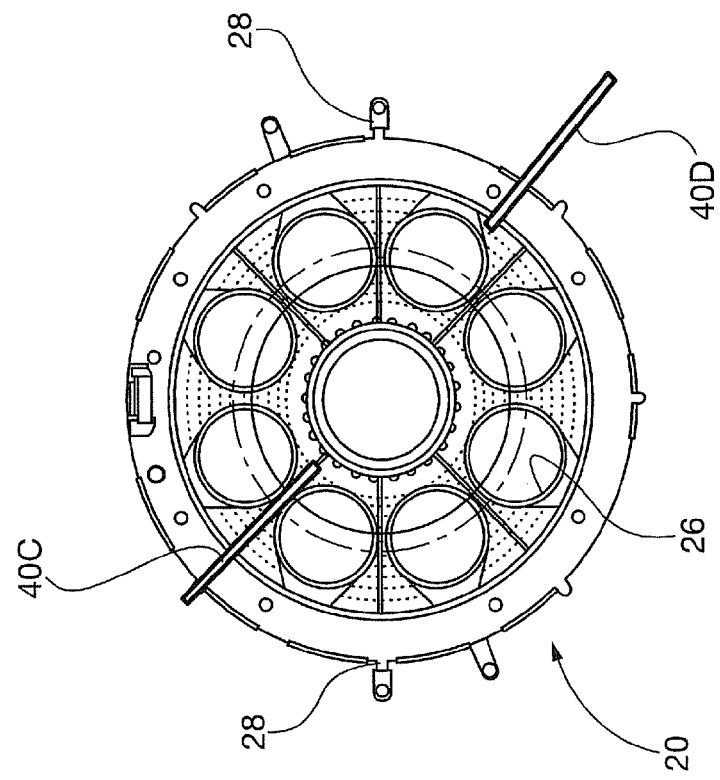
FIG. 6 is a radial end view of the combustor of FIG. 5.
Figure 5:
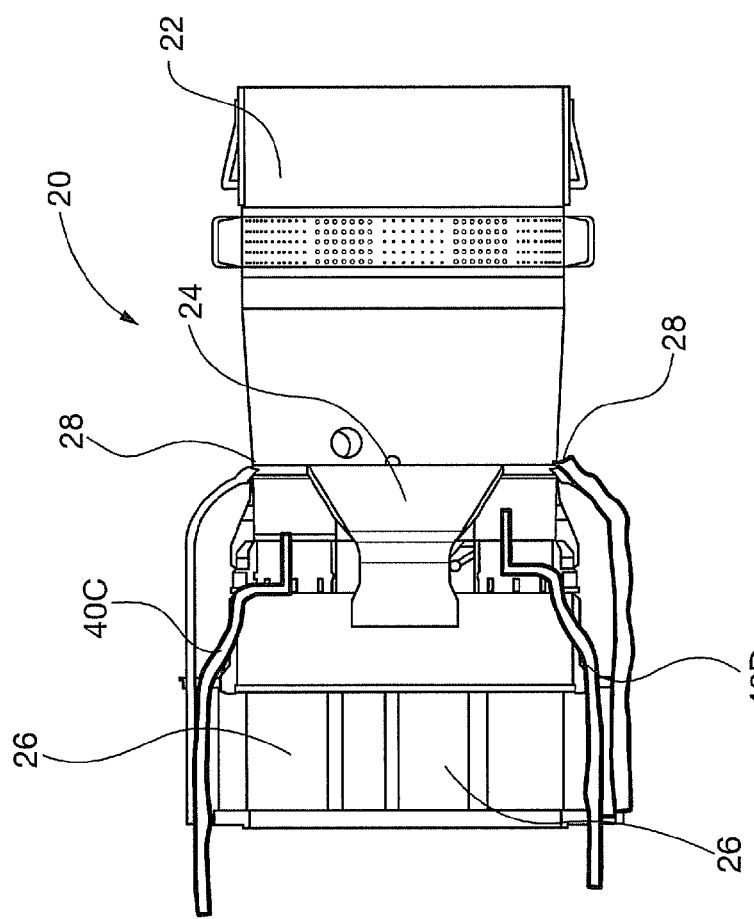
FIG. 5 is a schematic axial view of a combustor including embodiments of a flashback detection sensor cable of the present invention oriented axially within the combustor upstream a combustion zone.

FIGS. 3-6 show exemplary sensor cable 40A, 40B, 40C and 40D insertion orientations within an exemplary basket style combustor 20. In FIGS. 3 and 4 the sensor cables 40A, 40B are oriented in a radial or annular array in the fuel/air mixture zone, so that one or plural circumferential positions along the cables can be interrogated for local temperature information. Sensor cable 40A is shown circumscribing the outer periphery of the swirlers 26 and sensor cable 40B inscribes the inner periphery of the swirlers. In FIGS. 5 and 6 the sensor cables 40C, 40D are oriented in axial array so that one or plural axial positions along the cables can be interrogated for local temperature information. Both the sensor cables 40C and 40D is aligned axially with the swirlers 26 with distal tips inwardly directed toward the venturi 24. Any combination of one or more radially oriented sensor cables and/or axially oriented sensor cables may be utilized in the fuel/air mixture zone. Other sensor array orientation may be utilized in the fuel/air mixture zone.

Figure 7:
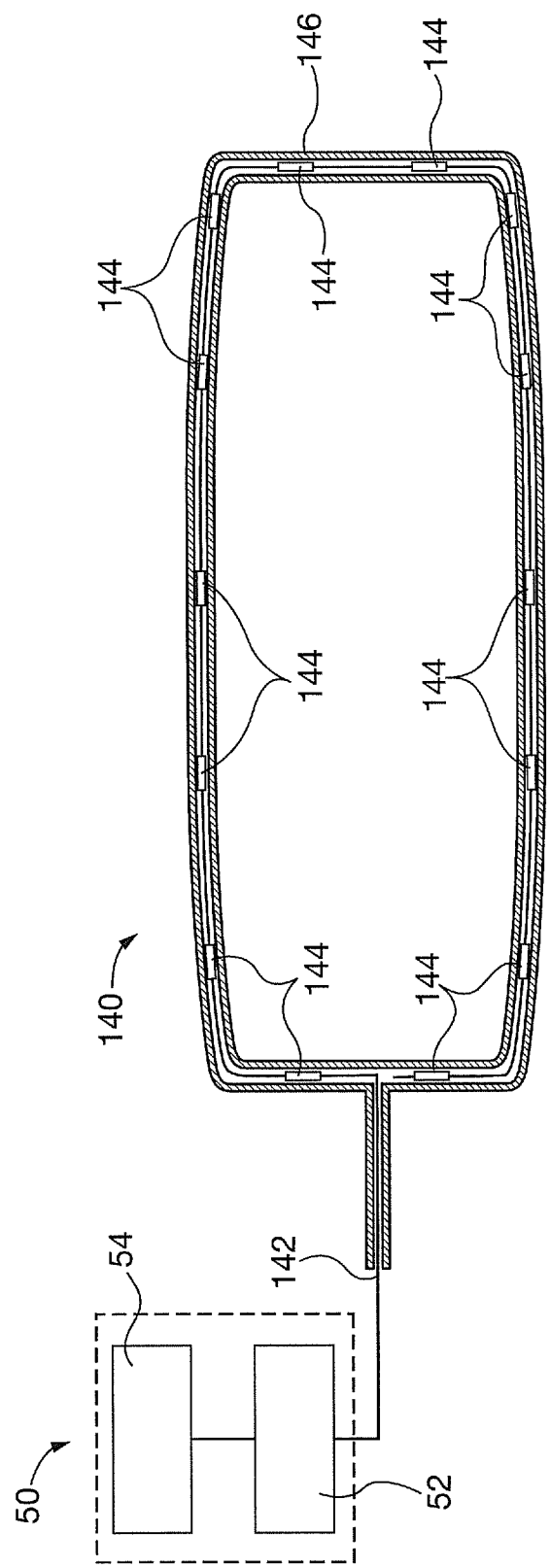
FIG. 7 is a plan view in partial cross-section of an embodiment of a flashback detection system including a flashback sensor cable of the present invention.

FIG. 7 is a schematic view of a flashback detector system 50 and construction of an exemplary embodiment flashback sensor cable 140. The sensor cable 140 has an optical fiber 142 that is coupled to the interrogator/light source 52 and the flashback detector 54. At least one and preferably a plurality of fiber Bragg grating (FBG) temperature sensors 144 are embedded along the optical fiber 142: all of which are of known construction. The FBG temperature sensor 144 a wavelength specific reflector that reflects particular light wavelengths transmitted from the light source back to the interrogator 52 and transmits all other wavelengths. Each respective serially embedded temperature sensor 144 reflects within a different wavelength band to distinguish respective reflections (hence serial location on the optical fiber 142) from each other when the reflections are received by the interrogator. As a well-known physical characteristic of FBG temperature sensors, changes in sensor temperature cause shifts in the sensor's reflected wavelength. Thus the flashback detector system 50 associates respective FBG temperature sensor 144 wavelength shifts with actual sensed temperature proximal the sensor. By interrogating each FBG temperature sensor 144 at a sufficiently high clock rate, (e.g., 10 Hz) a plurality of up to approximately 20 sensors can be monitored simultaneously and correlated with their physical location within a combustor. A high interrogation clock rate can also provide information about rates of temperature change within a single temperature sensor 144 or clusters of temperature sensors. In the simplest form of flashback monitoring, one or more temperature sensors 144 exceeding a threshold temperature can signify a flashback event. In more sophisticated monitoring systems, mappings of temperatures and/or their rates of change among different temperature sensors 144 arrayed within a combustor 20 can give more detailed information about the nature, speed and severity of a flashback event that may be utilized by the combustion turbine's control system to tailor an appropriate flashback extinguishing response.

Known construction optical fibers 142 and FBG temperature sensors 144 can sustain extended operating temperatures in the range of 1800-2200° F. (~1000-1200° C.). It is desirable to isolate the optical fiber 142 and its FBG temperature sensors 144 from the combustor environment for accurate temperature readings and longevity. As previously noted, the naked FBG sensors 144/optical fibers 142 need to be protected from combustion flashback, entrained fuel/airflow erosion, and/or vibration damage. Naked FBG sensors/fibers also need to be isolated from noise influences in the combustor basket environment that might impact accurate temperature and/or temperature rate of change readings, including vibration—or airflow-induced strains that cause reflected wavelength shift in the sensors. Accurate temperature readings and their rates of change require isolation of temperature-induced wavelength shifts from strain-induced wavelength shifts; i.e., "noise".

As shown in the embodiment of FIG. 7, the flashback sensor cable 140 includes a hollow conduit 146 that circumscribes the optical fiber 142 and provides thermal, mechanical, vibrational and environmental isolation for the fiber 142/sensors 144. Additionally the optical fiber 142 and FBG temperature sensors 144 within the conduit 146 are preferably covered with a temperature-resistant sheath material, such as silicon dioxide or silica (not shown in any of the figures herein). The conduit 144 may be configured in any physical shape needed to insert the sensor cable 140 within a combustor and orient the FBG temperature sensors 144 in selected physical locations. Suitable material for the conduit is high structural strength and heat resistant metal tubing, such as superalloy tubing. However, there is thermal conductivity tradeoff between the need for the conduit 146 material to provide good thermal and physical isolation for the optical fiber 142/FBG sensors 144 yet not impede the sensor ability to provide sufficient temperature change response to the flashback detection system—especially at a desired interrogation clock rate of 10 Hz. Sequentially interrogated temperature readings will not reflect true temperature state of the combustor air/fuel zone if the conduit thermal conductivity is too low to allow rapid heat transfer changes to the individual FBG sensors 144.

In order to satisfy the aforementioned thermal conductivity tradeoff, the present invention sensor cable provides a sensor shield that is oriented in circumferential proximity to the FBG sensor and substitutes for the conduit. The sensor shield is constructed of material having a higher thermal conductivity than the conduit. Sensor shield material is chosen to provide a sufficiently high thermal response to detect flashback. An exemplary embodiment of a flashback sensor cable 240 of the present invention is shown in FIGS. 8 and 9. The sensor cable 240 has a conduit 246, shown here in a circular pattern that is adapted for orientation of a radial/circumferential array of FBG temperature sensors 244 within a combustor, similar to that shown in FIGS. 3 and 4. The conduit 246 is constructed of heat resistant hollow tubing having a first thermal conductivity, and circumscribes optical fiber 242. Sensor shields 248 respectively comprise a hollow cavity tubular structures having first and second ends affixed to and in communication with the tubular conduit 246 hollow cavities by welding, brazing mechanical compression or other known metal joining methods. The optical fiber 242 passes through the shield 248 first and second ends, with the FBG temperature sensor 244 captured within the shield. The sensor shield 248 tubes are constructed of a metal having a second, higher conductivity than that of the conduit 246, to facilitate heat transfer response to the respective proximal FBG sensors 244 that are captured in the shield. In this way the sensor shields 248 facilitate accurate combustor transient temperature response by the proximally located FBG thermal sensors 244 that are interrogated by the flashback detector system 50 interrogator 52 and in turn accurate temperature readings are routed to the flashback detector 54.

Figure 12:
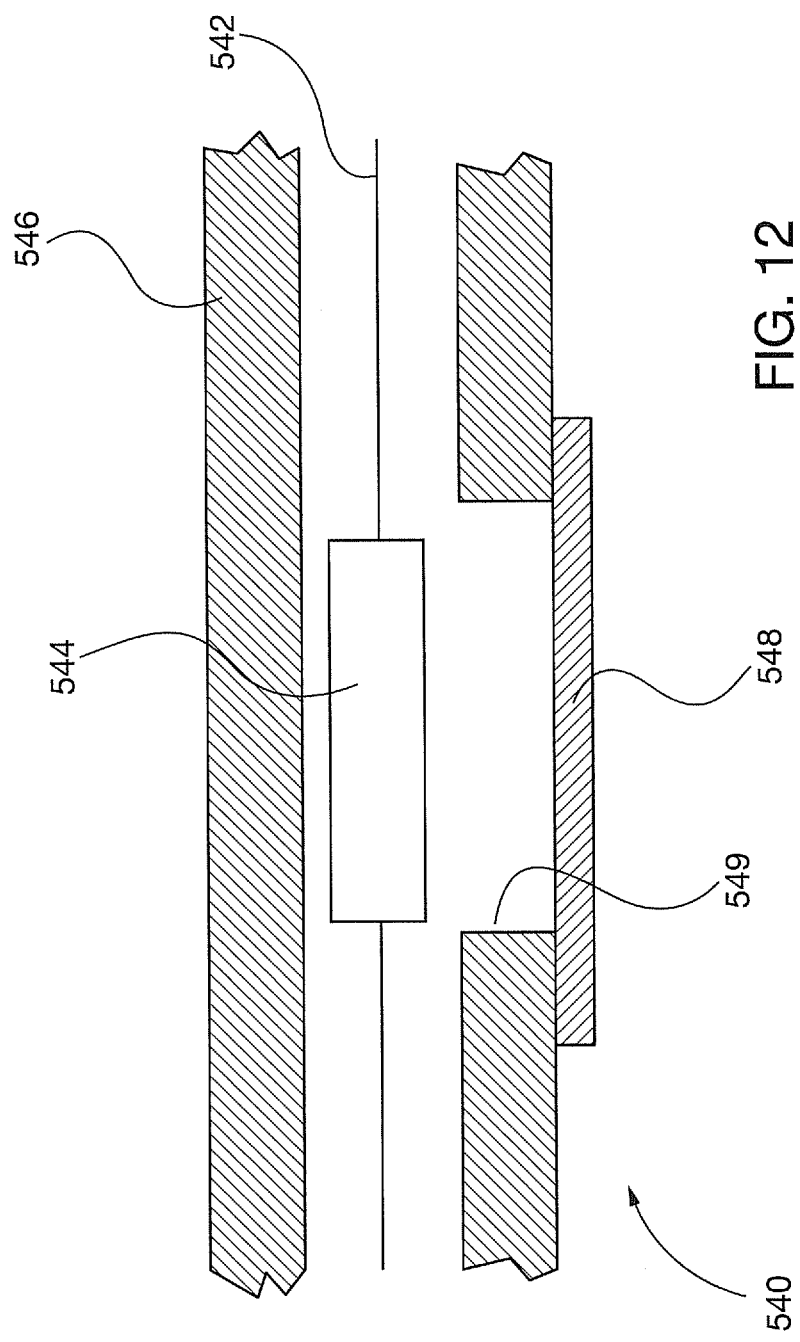
FIG. 12 is a cross-sectional view of an additional embodiment of a flashback sensor cable of the present invention.

Other non-limiting exemplary embodiments of sensor shields having higher effective thermal conductivity than the conduit are shown in FIGS. 10-12. In FIG. 10 the flashback sensor cable 340 thermal shield 348 has a cut-out aperture or window 349 that facilitates direct communication between the FBG temperature sensor 344 and the combustor thermal ambient environment. Aperture 349 dimensions are chosen to facilitate accurate temperature monitoring by the temperature sensor 344 via optical fiber 342, yet still provide sufficient environmental shielding. In FIG. 11 the flashback sensor cable 440 sensor shield 448 facilitates higher thermal conductivity by thinning the shield wall cross-section 449 proximal the FBG temperature sensor 444, so that accurate transient temperature response information is transmitted through the optical fiber 442. While the thermal shields 348 and 448 are shown as extended loops similar to that of FIGS. 8 and 9, either shield configuration can be formed directly in the conduit wall. For example the aperture 349 or the thinned wall cross-section 449 can be formed directly within the wall of the conduit 246 of FIGS. 8 and 9, eliminating the need for the extended loops 248. In FIG. 12, the flashback sensor cable 540 thermal shield 548 is a different metal overlaid across an aperture 549 and joined to the conduit 546 by known metal joining methods. The higher conductivity overlay thermal shield 548 desirably covers the aperture 549, providing environmental shielding to the proximal FBG temperature sensor 544 and optical fiber 542.

Although various embodiments, which incorporate the teachings of the present invention, have been shown and described in detail herein, those skilled in the art can readily devise many other varied embodiments that still incorporate these teachings. For example, while embodiments of the present invention turbine flashback sensor cables and temperature monitoring system are shown may be applied to combustion turbines with basket style combustors, the present invention may be applied to gas turbines having other types of combustor geometries, including by way of nonlimiting example gas turbines that have annular combustors.

What is claimed is:

1. A combustion turbine flashback sensor cable, comprising:
    an elongated optical fiber having a fiber Bragg grating (FBG) temperature sensor along the fiber;
    an elongated tubular conduit having a hollow cavity circumscribing and retaining the optical fiber therein, the conduit having a first thermal conductivity and a circumferential outer surface for exposure to combustion turbine combustion gasses; and
    a sensor shield coupled to and forming a portion of the conduit circumferential outer surface, oriented in axial and circumferential proximity to the FBG temperature sensor, having a second thermal conductivity greater than the first thermal conductivity.

2. The sensor cable of claim 1, the conduit having a wall thickness and the sensor shield comprising a thinner wall thickness formed within the conduit.

3. The sensor cable of claim 1, the conduit comprising a first material that defines an aperture formed within a portion of the conduit circumference and the sensor shield comprising a second material covering the aperture.

4. The sensor cable of claim 1, further comprising a plurality of fiber Bragg grating (FBG) temperature sensors spaced along the fiber; and a sensor shield corresponding to each respective FBG sensor.

5. A combustion turbine flashback sensor cable, comprising:
    an optical fiber having a fiber Bragg grating (FBG) temperature sensor along the fiber;
    a conduit having a hollow cavity circumscribing the optical fiber, the conduit having a first thermal conductivity; and
    a sensor shield coupled to the conduit, oriented in circumferential proximity to the FBG temperature sensor, having a second thermal conductivity greater than the first thermal conductivity, the sensor shield comprising having an aperture formed within a portion of the conduit circumference and dimensioned to inhibit combustion gas flow through the conduit cavity, for direct communication between the FBG temperature sensor and an ambient environment outside the conduit.

6. A combustion turbine flashback sensor cable, comprising:
    an optical fiber having a fiber Bragg grating (FBG) temperature sensor along the fiber;
    a conduit having a hollow cavity circumscribing the optical fiber, the conduit having a first thermal conductivity; and
    a sensor shield coupled to the conduit, oriented in circumferential proximity to the FBG temperature sensor, having a second thermal conductivity greater than the first thermal conductivity, the sensor shield including a hollow loop cavity having first and second ends in communication with the conduit hollow cavity, the optical fiber passing through the hollow loop cavity first and second ends, with the FBG temperature sensor within the hollow loop cavity.

7. A combustion turbine combustor temperature monitoring system, comprising:
    an elongated combustion turbine flashback sensor cable, adapted for insertion within a combustor upstream a combustion zone, the sensor cable having:
    an elongated optical fiber having a fiber Bragg grating (FBG) temperature sensor along the fiber:
    an elongated tubular conduit having a hollow cavity circumscribing and retaining, the optical fiber therein, the conduit having a first thermal conductivity and a circumferential outer surface for exposure to combustion turbine combustion gasses; and
a sensor shield coupled to and forming a portion of the conduit circumferential outer surface, oriented in axial and circumferential proximity to the FBG temperature sensor, having a second thermal conductivity greater than the first thermal conductivity;
an illumination source for transmission of light through the optical fiber; and
an optical sensor interrogator coupled to the optical fiber, for associating reflected light output from the fiber with temperature sensed by the FBG temperature sensor.

8. The system of claim 7, further comprising a flashback detector coupled to the optical sensor interrogator, for associating temperature sensed by the FBG temperature sensor with a turbine flashback event.

9. The system of claim 8, further comprising the flashback detector associating rate of change of temperature sensed by the FBG temperature sensor with a turbine flashback event.

10. The system of claim 9, further comprising:
a plurality of fiber Bragg grating (FBG) temperature sensors spaced along the fiber within the cable;
a sensor shield corresponding to each respective FBG sensor;
the cable adapted for orientation of respective FBG temperature sensors into a plurality of locations within a combustor basket;
the optical sensor interrogator associating reflected light output from the fiber with respective temperatures sensed by each respective FBG temperature sensor; and
the flashback detector associating the respective temperatures and rates of temperature change sensed by each respective FBG temperature sensor with a turbine flashback event.

11. The system of claim 7, further comprising:
a plurality of fiber Bragg grating (FBG) temperature sensors spaced along the fiber within the cable; and
a sensor shield corresponding to each respective FBG sensor;
the cable adapted for orientation of respective FBG temperature sensors into a plurality of locations within a combustor basket.

12. The system of claim 11, further comprising a flashback detector coupled to the optical sensor interrogator, for associating temperatures sensed by each respective FBG temperature sensor with a turbine flashback event.

13. The system of claim 12, the conduit having a wall thickness and the sensor shield comprising a thinner wall thickness formed within the conduit.

14. The system of claim 12, the conduit comprising a first material that defines an aperture formed within a portion of the conduit circumference and the sensor shield comprising a second material covering the aperture.

15. A combustion turbine combustor temperature monitoring system, comprising:
a combustion turbine flashback sensor cable, adapted for insertion into a plurality of locations within a combustor basket upstream a combustion zone the sensor cable having:
an optical fiber having a plurality of fiber Bragg grating (FBG) temperature sensors spaced along the fiber;
a conduit having a hollow cavity circumscribing the optical fiber, the conduit having a first thermal conductivity; and
a sensor shield corresponding to each respective FBG sensor, oriented in circumferential proximity to the FBG temperature sensor, having a second thermal conductivity greater than the first thermal conductivity, at least one sensor shield including either:
an aperture formed within a portion of the conduit circumference and dimensioned to inhibit combustion gas flow through the conduit cavity, for direct communication between the FBG temperature sensor and an ambient environment outside the conduit; or
at least one sensor shield including a hollow loop cavity having first and second ends in communication with the conduit hollow cavity, the optical fiber passing through the hollow loop cavity first and second ends, with the FBG temperature sensor within the hollow loop cavity;
an illumination source for transmission of light through the optical fiber;
an optical sensor interrogator coupled to the optical fiber, for associating reflected light output from the fiber with temperature sensed by the FBG temperature sensor; and
a flashback detector coupled to the optical sensor interrogator, for associating temperatures sensed by each respective FBG temperature sensor with a turbine flashback event.

16. A combustion turbine, comprising:
a plurality of combustors;
combustion turbine flashback sensor cable, inserted in each respective combustor upstream a combustion zone, the sensor cable having:
an elongated optical fiber and a fiber Bragg grating (FBG) temperature sensor along the fiber;
an elongated tubular conduit having a hollow cavity circumscribing and retaining the optical fiber therein, the conduit having a first thermal conductivity and a circumferential outer surface for exposure to combustion turbine combustion gasses; and
a sensor shield coupled and forming a portion of to the conduit circumferential outer surface, oriented in axial and circumferential proximity to the FBG temperature sensor, having a second thermal conductivity greater than the first thermal conductivity;
an illumination source coupled to each respective optical fiber for transmission of light through the optical fiber; and
an optical sensor interrogator coupled to each respective optical fiber, for associating reflected light output from the fiber with temperature sensed by the respective FBG temperature sensors.

17. The combustion turbine of claim 16, at least one sensor cable further comprising;
a plurality of fiber Bragg grating (FBG) temperature sensors spaced along the fiber within the at least one cable;
a sensor shield corresponding to each respective FBG sensor;
the at least one cable adapted for orientation of respective FBG temperature sensors into a plurality of radially oriented locations within at least one combustor upstream a combustion zone; and
the optical sensor interrogator associating reflected light output from the fiber in the at least one cable with respective temperatures sensed by each respective FBG temperature sensor.

18. The combustion turbine of claim 16, at least one sensor cable further comprising;
a plurality of fiber Bragg grating (FBG) temperature sensors spaced along the fiber within the at least one cable;
a sensor shield corresponding to each respective FBG sensor;

the at least one cable adapted for orientation of respective FBG temperature sensors into a plurality of axially oriented locations within at least one combustor upstream a combustion zone; and the optical sensor interrogator associating reflected light output from the fiber in the at least one cable with respective temperatures sensed by each respective FBG temperature sensor.

19. The combustion turbine of claim 16, further comprising a flashback detector coupled to the optical sensor interrogator, for associating the respective temperatures and rates of temperature change sensed by each respective FBG temperature sensor with a turbine flashback event.

* * * * *